United States Patent (10) Patent No.: US 7,877,256 B2
Li et al. (45) Date of Patent: Jan. 25, 2011

(54) TIME SYNCHRONOUS DECODING FOR LONG-SPAN HIDDEN TRAJECTORY MODEL

(75) Inventors: Xiaolong Li, White Plains, NY (US); Li Deng, Sammamish, WA (US); Dong Yu, Kirkland, WA (US); Alejandro Acero, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 997 days.

(21) Appl. No.: 11/356,905

(22) Filed: Feb. 17, 2006

(65) Prior Publication Data

US 2007/0198266 A1 Aug. 23, 2007

(51) Int. Cl.
*G10L 15/14* (2006.01)
(52) U.S. Cl. .................. 704/256; 704/231; 704/242
(58) Field of Classification Search ............ 704/231, 704/242, 256
See application file for complete search history.

(56) References Cited

U.S. PATENT DOCUMENTS

| 5,129,002 | A | * | 7/1992 | Tsuboka | 704/246 |
| 5,515,475 | A | * | 5/1996 | Gupta et al. | 704/242 |
| 5,677,988 | A | * | 10/1997 | Takami et al. | 704/256 |
| 5,706,397 | A | * | 1/1998 | Chow | 704/243 |
| 5,787,396 | A | * | 7/1998 | Komori et al. | 704/256 |
| 6,067,520 | A | * | 5/2000 | Lee | 704/270 |
| 6,397,179 | B2 | * | 5/2002 | Crespo et al. | 704/242 |
| 6,931,374 | B2 | | 8/2005 | Attias | 704/240 |
| 7,050,975 | B2 | | 5/2006 | Deng | 704/239 |
| 7,092,883 | B1 | * | 8/2006 | Gretter et al. | 704/242 |
| 7,295,980 | B2 | * | 11/2007 | Garner et al. | 704/254 |
| 7,319,960 | B2 | * | 1/2008 | Riis et al. | 704/256.4 |
| 7,464,033 | B2 | * | 12/2008 | Gong | 704/256.2 |
| 2002/0048350 | A1 | * | 4/2002 | Phillips et al. | 379/88.01 |
| 2005/0149326 | A1 | * | 7/2005 | Hogengout et al. | 704/242 |
| 2005/0267751 | A1 | * | 12/2005 | Bangalore et al. | 704/242 |
| 2006/0074676 | A1 | | 4/2006 | Deng | 704/261 |
| 2006/0100862 | A1 | | 5/2006 | Deng | 704/207 |
| 2006/0200351 | A1 | | 9/2006 | Acero | 704/254 |
| 2007/0143104 | A1 | | 6/2007 | Deng | 704/209 |

OTHER PUBLICATIONS

Jian-Lai Zhou; Seide, F.; Li Deng, "Coarticulation modeling by embedding a target-directed hidden trajectory model into HMM—model and training," Acoustics, Speech, and Signal Processing, 2003. Proceedings. (ICASSP '03). 2003 IEEE International Conference on , vol. 1, no., pp. I-744-I-747 vol. 1, Apr. 6-10, 2003.*

(Continued)

*Primary Examiner*—Richemond Dorvil
*Assistant Examiner*—Douglas C Godbold
(74) *Attorney, Agent, or Firm*—Joseph R. Kelly; Westman, Champlin & Kelly P.A.

(57) ABSTRACT

A time-synchronous lattice-constrained search algorithm is developed and used to process a linguistic model of speech that has a long-contextual-span capability. In the algorithm, hypotheses are represented as traces that include an indication of a current frame, previous frames and future frames. Each frame can include an associated linguistic unit such as a phone or units that are derived from a phone. Additionally, pruning strategies can be applied to speed up the search. Further, word-ending recombination methods are developed to speed up the computation. These methods can effectively deal with an exponentially increased search space.

12 Claims, 7 Drawing Sheets

OTHER PUBLICATIONS

Kirchhoff, "Robust Speech Recognition Using Articulatory Information," PhD thesis, University of Bielefeld, Germany, Jul. 1999, pp. 1-136.*

U.S. Appl. No. 11/093,833, filed Oct. 12, 2006, Acero et al.

U.S. Appl. No. 11/356,905, filed Aug. 23, 2007, Li et al.

L. Deng, X. Li, D. Yu and A. Acero, "A Hidden Trajectory Model with Bi-directional Target-Filtering: Cascaded vs. Integrated Implementation for Phonetic Recognition" Proc. of ICASSP, pp. 337-340, Philidelphia, PA, USA 2005.

D. Yu, L. Deng and A. Acero, "Evaluation of a Long-contextual-span Hidden Trajectory Model and Phonetic Recognizer Using A* Lattice Search", Proc. of Eurospeech, Lisboa, Sep. 2005.

L. Deng, D. Yu, X. Li, and A. Acero "A long-contextual-span Model of Resonance Dynamics for Speech Recognition: Parameter Learning and Recognizer Evaluation" accepted into IEEE Workshop on Automatic Speech Recognition & Understanding, Cancun, Mexico, Nov. 2005.

H. Ney, S. Ortmanns, "Dynamic programming search for continuous speech recognition" IEEE Signal Processing Magazine, 16 (5), pp. 64-83, 1999.

A. Sixtus, Crossword Phoneme Models for Large Vocabulary Continuous Speech Recognition PhD. Dissertation, RWTH, Germany, 2003.

D. B. Wagner, "Dynamic Programming," The Mathematica Journal, vol. 5., issue 4, pp. 42-51 (1995).

L. Deng, D. Yu, and A. Acero. "A quantitative model for formant dynamics and contextually assimilated reduction in fluent speech", in Proc. ICSLP, pp. 719-722, Jeju, Korea, 2004.

L. Deng, D. Yu, and A. Acero. "Learning statistically characterized resonance targets in a hidden trajectory model of speech coarticulation and reduction", in Proc. Interspeech 2005, Lisbon, Sep. 2005, pp. 1097-1100.

M. Akagi. "Modeling of contextual effects based on spectral peak interaction," in J. Acoust. Soc. Am., vol. 93, No. 2, pp. 1076-1086, 1993.

J. Glass. "A probabilistic framework for segment-based speech recognition," in Computer Speech and Language, vol. 17, 2003, pp. 137-152.

J. Krause and L. Braida. "Acoustic properties of naturally produced clear speech at normal speaking rates," in J. Acoust. Soc. Am., vol. 115, No. 1, pp. 362-378, 2004.

S. Ortmanns, A. Eiden, H. Ney and N. Coenen, "Look-ahead Techniques for Fast Beam Search" Proc. of ICASSP, pp. 1783-1786, Munich, Germany 1997.

B-H Tran, V. Steinbiss and H. Ney, "Improvements in beam search" In Proc. of ICSLP, pp. 2143-2146, 1994.

* cited by examiner

TIME SYNCHRONOUS DECODING FOR LONG-SPAN HIDDEN TRAJECTORY MODEL

BACKGROUND

The discussion below is merely provided for general background information and is not intended to be used as an aid in determining the scope of the claimed subject matter.

A pattern recognition system, such as a speech recognition system or a handwriting recognition system, takes an input signal and attempts to decode the signal to find a pattern represented by the signal. For example, in a speech recognition system, a speech signal (often referred to as a test signal) is received by the recognition system and is decoded to identify a string of words represented by the speech signal.

Many pattern recognition systems utilize models in which units are represented by a single tier of connected states. Using a training signal, probability distributions for occupying the states and for transitioning between states are determined for each of the units. In speech recognition, phonetic units are used. To decode a speech signal, the signal is divided into frames and each frame is transformed into a feature vector. The feature vectors are then compared to the distributions for the states to identify a most likely sequence of states that can be represented by the frames. The phonetic unit that corresponds to that sequence is then selected.

SUMMARY

This Summary is provided to introduce some concepts in a simplified form that are further described below in the Detailed Description. This Summary is not intended to identify key features or essential features of the claimed subject matter, nor is it intended to be used as an aid in determining the scope of the claimed subject matter.

A time-synchronous search algorithm can be used to decode a hidden trajectory model (HTM). In the algorithm, hypotheses are represented as traces that include an indication of a current frame, previous frames and future frames in a possible sequence. Each frame can include an associated linguistic unit. Additionally, pruning strategies can be applied to speed up the search.

DETAILED DESCRIPTION

Figure 1:
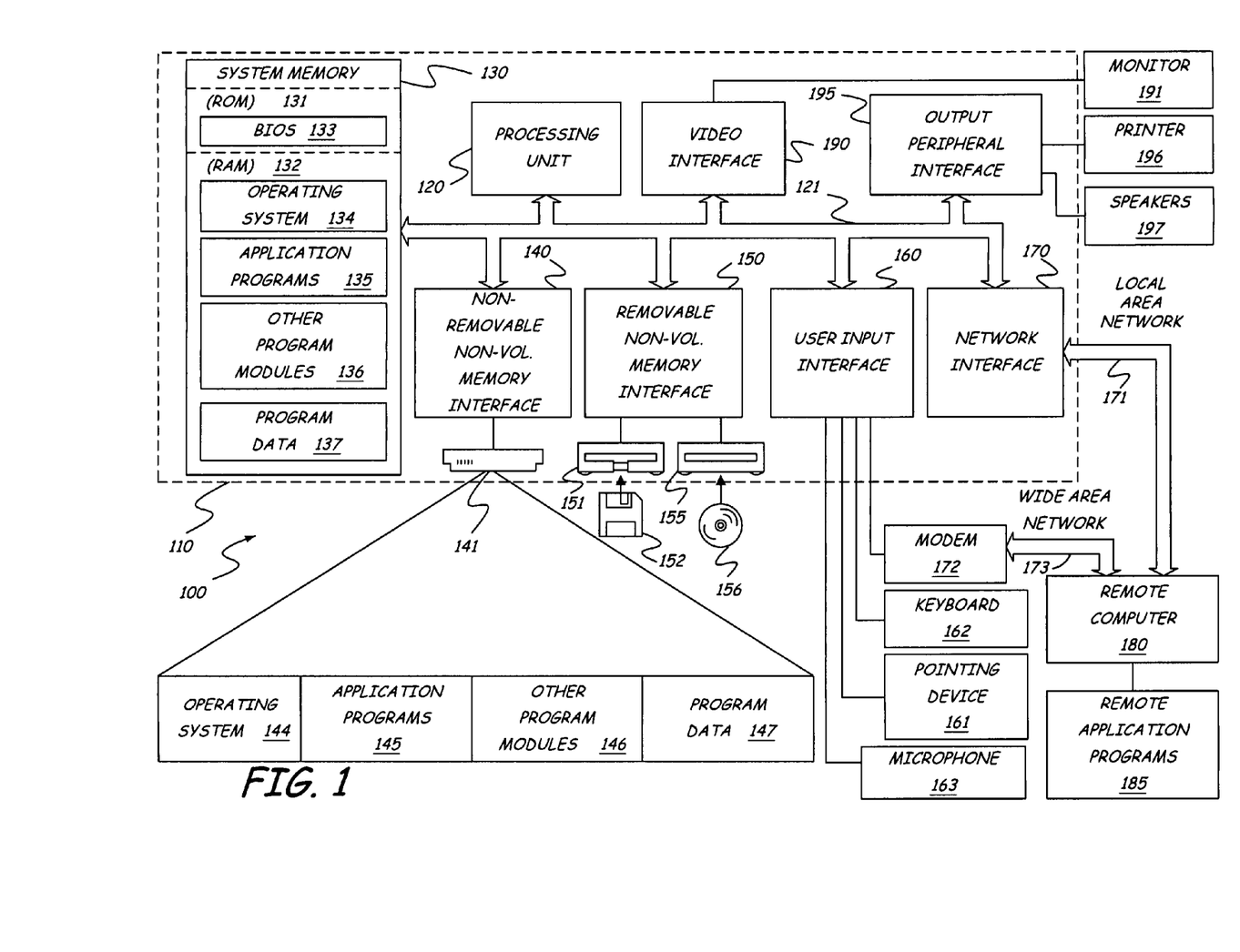
FIG. 1 is a block diagram of a computing environment.

FIG. 1 illustrates an example of a suitable computing system environment 100 on which concepts presented herein may be implemented. The computing system environment 100 is only one example of a suitable computing environment and is not intended to suggest any limitation as to the scope of use or functionality of the concepts presented herein. Neither should the computing environment 100 be interpreted as having any dependency or requirement relating to any one or combination of components illustrated in the exemplary operating environment 100.

The concepts presented herein are operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The concepts presented herein may be described in the general context of computer-executable instructions, such as program modules, being executed by a computer. Generally, program modules include routines, programs, objects, components, data structures, etc. that perform particular tasks or implement particular abstract data types. The concepts may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable medium.

With reference to FIG. 1, an exemplary system for implementing the concepts presented herein includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
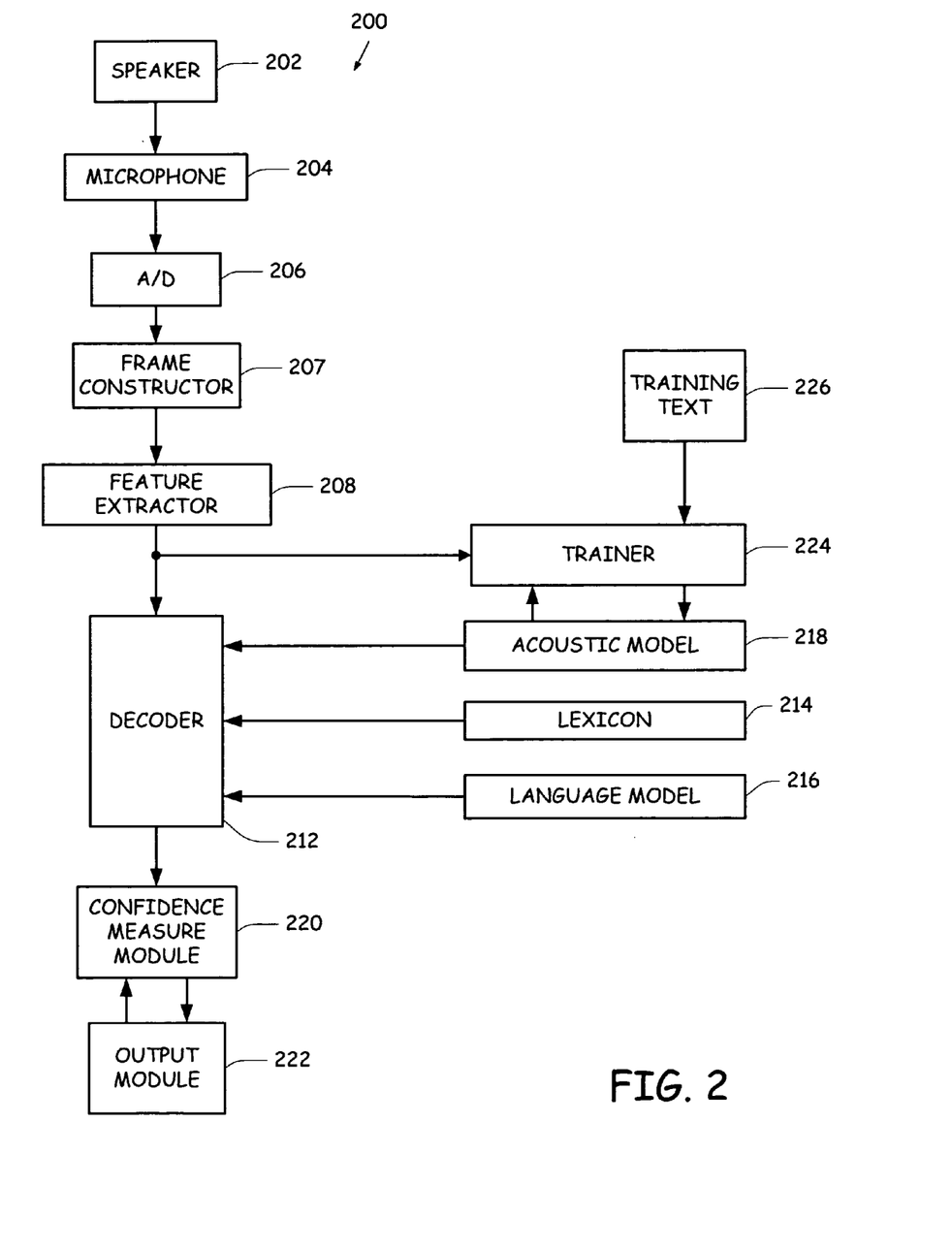
FIG. 2 is a block diagram of a speech recognition system.

FIG. 2 provides a block diagram of a speech recognition system 200. In FIG. 2, a speaker 202, either a trainer or a user, speaks into a microphone 204. The audio signals detected by microphone 204 are converted into electrical signals that are provided to analog-to-digital converter 206.

A-to-D converter 206 converts the analog signal from microphone 204 into a series of digital values. In several embodiments, A-to-D converter 206 samples the analog signal at 16 kHz and 16 bits per sample, thereby creating 32 kilobytes of speech data per second. These digital values are provided to a frame constructor 207, which, in one embodiment, groups the values into 25 millisecond frames that start 10 milliseconds apart.

The frames of data created by frame constructor 207 are provided to feature extractor 208, which extracts a feature from each frame. Examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that system 200 is not limited to these feature extraction modules and that other modules may be used within the context of system 200.

The feature extraction module 208 produces a stream of feature vectors that are each associated with a frame of the speech signal. This stream of feature vectors is provided to a decoder 212, which identifies a most likely sequence of words based on the stream of feature vectors, a lexicon 214, a language model 216 (for example, based on an N-gram, context-free grammars, or hybrids thereof), and an acoustic model 218.

The most probable sequence of hypothesis words is provided to a confidence measure module 220. Confidence measure module 220 identifies which words are most likely to have been improperly identified by the speech recognizer, based in part on a secondary acoustic model (not shown).

Confidence measure module 220 then provides the sequence of hypothesis words to an output module 222 along with identifiers indicating which words may have been improperly identified. Those skilled in the art will recognize that confidence measure module 220 is not necessary for the operation of system 200.

During training, a speech signal corresponding to training text 226 is input to decoder 212, along with a lexical transcription of the training text 226. Trainer 224 trains acoustic model 218 based on the training inputs. Acoustic model 218 is intended to be one example implementation of a model. Other types of pattern recognition systems can utilize the subject matter described herein, namely handwriting recognition systems.

Modeling long-span contextual effects in speech acoustics is useful in speech recognition, especially for recognizing spontaneous speech, where phonetic reduction and coarticulation are often mixed. In one example, a long-contextual-span hidden trajectory model (HTM) is used as acoustic model 218 and is based on a bi-directional target filtering approach to modeling speech coarticulation and context assimilated reduction. One such model is discussed in an article authored by L. Deng, X. Li, D. Yu, and A. Acero and entitled, "A Hidden Trajectory Model with Bi-directional Target-Filtering: Cascaded vs. Integrated Implementation for Phonetic Recognition", Proc. ICASSP, pp. 337-340, 2005, Philadelphia, Pa., USA.

In one example HTM model, each phone or unit (units are derived from phones; e.g., a diphthong or an affricate are decomposed into two units) in the HTM unit set is assumed to have a single target which follows a Gaussian distribution. Vocal Tract Resonance (VTR) trajectories are obtained by filtering a target sequence through a bi-directional non-causal filter and treated as hidden vectors. A nonlinear prediction with statistical residuals generates cepstral parameters from the VTR trajectories. The statistical characterization of HTM allows for straightforward computation of a model likelihood score for cepstral observation data given the phone or unit sequence and phone or unit segment boundaries.

This bi-directional filter based HTM functionally achieves both anticipatory and regressive coarticulation, while leaving phonological units as a linear phonemic sequence and bypassing the use of more elaborate nonlinear phonological constructs. Different from other types of acoustic models such as Hidden Markov Model (HMM), the HTM uses a compact set of context-independent parameters to represent long-span contextual effects in the acoustic model through the technique of parametric filtering on VTR. In other words, the HTM can model longer context dependencies without introducing additional parameters.

The long-contextual-span nature of the HTM, however, presents special challenges for decoding—the search space increases dramatically and the search space can span a variable number of units and frames. A time-synchronous search algorithm can be used for evaluating the HTM. In this algorithm, hypotheses are represented as traces, which include an indication of a current frame, previous frames and future frames. Frames in the traces include a particular unit. Pruning strategies can be applied to speed up the search. Prior to discussing time-synchronous decoding, an example HTM is discussed.

The Hidden Trajectory Model

One hidden trajectory model (HTM) involves three steps. In the first step, a phone or unit sequence hypothesis is mapped into an HTM unit sequence and its corresponding VTR targets based on the unit segment information. In the second step, the model predicts the VTR trajectory of the unit sequence hypothesis by applying a bi-directional filter on the targets. In the third step, the model converts the estimated VTR trajectory into the cepstral trajectory with a non-linear formula. A likelihood score is then calculated by comparing the estimated cepstral trajectory with the cepstrum derived directly from the wave form. The system can conduct these steps one by one, wherein the targets are considered as a fixed value for each unit. When taking into consideration the VTR target variances and considering the VTR trajectories as hidden variables when computing the likelihood, an integrated calculation of the likelihood score can be used.

Transfer a Phone/Unit Sequence to a Target Sequence

To predict the VTR trajectory of a unit sequence, units are converted into an HTM unit set. Any source unit set can be used. One particular source unit set is referred to as the TIMIT (Texas Instrument/Massachusetts Institute of Technology) unit set. Table 1 shows transformation rules for the TIMIT phone/unit set to an HTM unit set. There are four types of phones/units in Table 1. The first type of phones/units keeps its original phone name. For example, phone sh is mapped to sh in the HTM phone/unit set. The second type of phones/units maps to different units based on the phone that follows it. If the next phone is one of the front vowels (i.e., ae, eh, ih, iy, y, and ey), the unit is mapped to the "front" version of the unit. Otherwise, the unit is mapped to the same unit. For example, unit b may be mapped to unit b_f or b based on the next unit. The third type of the phones/units is the composite phone. Composite phones are split into two HTM units at the middle of the segment. For example, phone aw becomes aw1 and aw2 in the HTM unit set. The fourth type of phones/units transform to the HTM unit based on the specific rules defined in Table 1. For example, phone gcl becomes HTM phone vcl.

TABLE 1

MAP ORIGINAL UNIT SET TO HTM UNIT SET

| Type | Description | Original Phone | Convertion Rule |
|---|---|---|---|
| 1 | Phones unchanged after the mapping | d, t, dx, vcl, cl, s, sh, z, zh, th, dh, n, l, r, w, y, hh, iy, ih, eh, ae, aa, ah, uh, uw, er, ax, sil, sp | ph → ph |
| 2 | Phones mapped to different HTM phones based on the phone follows it | b, g, p, f, k, m, ng, v | if ph ∈ {ae, eh, ih, iy, y, ey1} ph → ph_f otherwise ph → ph |
| 3 | Composite phones | jh, ch, ey, aw, ay, oy, ow, | ph → ph1 + ph2 |
| 4 | Phones follow specific conversion rules | q, kcl, pcl, tcl | ph → cl |
| | | bcl, dcl, gcl | ph → vcl |
| | | em | ph → m |
| | | En, nx | ph → n |
| | | eng | ph → eng |
| | | hv | ph → hh |
| | | el | ph → l |
| | | ao | ph → aa |
| | | ux | ph → uw |
| | | ix, ax-h | ph → ax |
| | | axr | ph → er |
| | | pau, h#, <s>, </s> | ph → sil |
| | | epi | ph → sp |

Once the phones/units are transformed into HTM units, each unit S (except units sil, cl, vcl, hh, and sp which inherit targets from the unit that follows it) is associated with a multidimensional target vector $t_s$ that follows a Gaussian distribution:

$$p(t_s) = p(t|s) = N(t; \mu_{T_s}, \Sigma_{T_s}), \quad (1)$$

where $\mu_{T_s}$ is the mean of the Gaussian distribution, and $\Sigma_{T_s}$ is the variance of the Gaussian distribution. Each target t consists of P resonant frequencies f followed by P bandwidths b. That is, $$t = \begin{pmatrix} f \\ b \end{pmatrix}, \quad (2)$$

where $$f = \begin{pmatrix} f_1 \\ f_2 \\ \vdots \\ f_P \end{pmatrix} \text{ and } b = \begin{pmatrix} b_1 \\ b_2 \\ \vdots \\ b_P \end{pmatrix}. \quad (3)$$

Thus, given the phone/unit sequence and its boundaries, a sequence of targets can be formed that is a function of discrete time and jumps at the segments' boundaries. Mathematically, the target sequence can be represented as a sequence of stepwise constant functions with variable durations and heights:

$$t(k) = \sum_{i=1}^{I} [u(k - k_{s_i}^l) - u(k - k_{s_i}^r)] t_{s_i}, \quad (4)$$

where u(k) is the unit step function, $k_s^r$, $s = s_1, s_2, \ldots, s_I$ are the right boundary sequence of the P segments in the utterance, and $k_s^l$, $s = s_1, s_2, \ldots, s_I$ are the left boundary sequence. In general, $k_{s_{i+1}}^l = k_{s_i}^r$ for $1 \leq i < I$.

The difference of the two gives the duration sequence. $t_s$, $s = s_1, s_2, \ldots, s_I$ are the target vectors for segment s.

Convert Target Sequence to VTR Trajectories

The target sequence is taken as input of a slowly time-varying, bi-directional finite impulse response (FIR) filter to estimate the VTR trajectories. This filter is characterized by the following non-causal, vector-valued, impulse response function:

$$h_s(k) = \begin{cases} c\gamma_{s(k)}^{-k} & -D < k < 0 \\ c & k = 0 \\ c\gamma_{s(k)}^{k} & 0 < k < D, \end{cases} \quad (5)$$

where k represents time frame, each of which is typically 10 msec, $\gamma_{s(k)}$ is the stiffness parameter vector, one component for each VTR order. Each component of the stiffness vector is a positive real value between zero and one. The subscript s(k) in $\gamma_{s(k)}$ indicates that the stiffness vector is dependent on the segment state s(k) which varies over time. D in equation (5) is a unidirectional length of the impulse response, representing the temporal extent of coarticulation in the temporal direction, assumed for simplicity to be equal in length for the forward direction (anticipatory coarticulation) and the backward direction (regressive coarticulation).

In equation (5), c is the normalization constant to ensure that the filter weights add up to one. For simplicity, we make the assumption that over the temporal span $-D \leq k \leq D$, the stiffness parameter's value stays approximately constant:

$$\gamma_{s(k)} \approx \gamma_{s(0)}. \quad (6)$$

That is, the adjacent segments within the temporal span 2D+1 in length which contribute to the coarticulated home segment have the same stiffness parameter value as that of the home segment. Under this assumption, c can be determined by requiring that the filter coefficients sum to one:

$$\sum_{k=-D}^{D} h_s(k) = c \sum_{k=-D}^{D} \gamma_{s(k)}^{|k|} \quad (7)$$

$$\approx c[1 + 2(\gamma_{s(0)} + \gamma_{s(0)}^2 + \ldots + \gamma_{s(0)}^D)]$$

$$= c \frac{1 + \gamma_{s(0)} - 2\gamma_{s(0)}^{D+1}}{1 - \gamma_{s(0)}}$$

$$= 1.$$

Thus, $$c_\gamma = c_{\gamma_{s(0)}} \approx \frac{1 - \gamma_{s(0)}}{1 + \gamma_{s(0)} - 2\gamma_{s(0)}^{D+1}}. \quad (8)$$

Given the filter's impulse response and the input to the filter, the filter's output as the model's prediction for the VTR trajectories is the convolution between these two signals. The result of the convolution within the boundaries of the home segment s is:

$$z_s(k) = h_{s(k)} \otimes t(k) = \sum_{\tau = k-D}^{k+D} c(\gamma_{s(\tau)}) t_{s(\tau)} \gamma_{s(\tau)}^{|k - \tau|}, \quad (9)$$

where the input target vector and the filter's stiffness vector may take not only values associated with the current home segment, but also those associated with the adjacent segments since the time τ in equation (9) can go beyond the home segment's boundaries.

A sequential concatenation of all outputs $z_s(k)$, $s = s_1, s_2, \ldots, s_P$ constitutes the model prediction of VTR trajectories for the entire utterance:

$$z(k) = \sum_{i=1}^{P} [u(k - k_{s_i}^l) - u(k - k_{s_i}^r)] z_{s_i}(k). \quad (10)$$

Note that the convolution operation above carried out by the filter in the model guarantees continuity of the trajectories at each junction of two adjacent segments, contrasting the discontinuous jump in the input to the filter at the same junction. This continuity is applied to all classes of speech sounds including consonantal closure. This provides the mechanism for coarticulation and VTR target undershooting in the current hidden trajectory model.

The bi-directional filter gives rise to both forward and backward coarticulation, since it makes the VTR value at each time dependent on not only the current unit's VTR target but also on the VTR targets of the adjacent units. This filtering process has been shown to give quantitative prediction of the magnitude of contextually assimilated reduction and coarticulation.

Since the VTR vector z(k) (at each frame k) is a linear function of the targets t that follows a Gaussian distribution, z(k) is a Gaussian as well:

$$p(z(k)|s) = N[z(k); \mu_{z(k)}, \Sigma_{z(k)}], \quad (11)$$

whose mean vector $\mu_{z(k)}$ is:

$$\mu_{z(k)} = \sum_{\tau=k-D}^{k+D} c_\gamma \gamma_{s(\tau)}^{|k-\tau|} \mu_{T_{s(\tau)}} = a_k \cdot \mu_{T_{s(\tau)}}, \quad (12)$$

and the covariance matrix is:

$$\Sigma_{z(k)} = \sum_{\tau=k-D}^{k+D} c_\gamma^2 \gamma_{s(\tau)}^{2|k-\tau|} \Sigma_{T_{s(\tau)}} = v_k \cdot \Sigma_{T_{s(\tau)}}. \quad (13)$$

In our current implementation, both the target covariance matrix $\Sigma_{T_s}$ and the VTR vector covariance matrix $\Sigma_{z(k)}$ for each unit segment are approximated by a diagonal matrix.

Convert VTR Trajectories to Cepstral Trajectories

The mapping between the VTR vector z(k) at each time frame k and the estimated corresponding vector of LPC cepstra ô(k) can be represented by $$\hat{o}_j(k) = F_j(k) = \frac{2}{j} \sum_{p=1}^{P} e^{-\pi j \frac{b_p(k)}{f_s}} \cos\left(2\pi j \frac{f_p(k)}{f_s}\right), \quad (14)$$

where P is the highest VTR order (P=4 in the current implementation) and $f_s$ is the sampling rate (e.g., $f_s$=16000 in the TIMIT dataset).

The cepstral prediction's residual vector can be modeled as:

$$r_s(k) = o(k) - F[z(k)], \quad (15)$$

as a Gaussian distribution $$p(r_s(k)|z(k),s) = N[r_s(k); \mu_{r_s(k)}, \Sigma_{r_s(k)}], \quad (16)$$

whose mean vector is $\mu_{r_s(k)}$ and the covariance matrix is $\Sigma_{r_s(k)}$. The conditional distribution of the observation is thus:

$$p(o(k)|z(k),s) = N[o(k); F[z(k)] + \mu_{r_s(k)}, \Sigma_{r_s(k)}]. \quad (17)$$

In order to compute the acoustic observation likelihood, the nonlinear mean function of F[z(k)] is linearized by using the first-order Taylor series approximation:

$$F[z(k)] \approx F[z_0(k)] + F'[z_0(k)](z(k) - z_0(k)), \quad (18)$$

where the components of Jacobian matrix F'[.] can be computed in a closed form of $$F'_j[f_p(k)] = -\frac{4\pi}{f_s} e^{-\pi j \frac{b_p(k)}{f_s}} \sin\left(2\pi j \frac{f_p(k)}{f_s}\right), \quad (19)$$

for the VTR frequency components of z, and $$F'_j[b_p(k)] = -\frac{2\pi}{f_s} e^{-\pi j \frac{b_p(k)}{f_s}} \cos\left(2\pi j \frac{f_p(k)}{f_s}\right), \quad (20)$$

for the bandwidth components of z.
Thus:

$$p(o(k)|z(k),s) \approx N[o(k); \mu_{o_s(k)}, \Sigma_{r_s(k)}], \quad (21)$$

where $$\mu_{o_s(k)} = F'[z_0(k)]z(k) + (F'[z_0(k)] - F'[z_0(k)]z_0(k) + \mu_{r_s(k)}) \quad (22)$$

Calculate the Likelihood Score

The likelihood value of acoustic observation vectors o(k) given the unit sequence hypothesis is calculated. Once the model knows the likelihood for each possible unit sequence, the model can simply output the unit sequence with the highest likelihood as the recognition result, i.e., $$\hat{w} = \underset{w}{\operatorname{argmax}}\, p(o|w). \quad (23)$$

When computing the HTM likelihood score, VTR values z(k) are treated as hidden variables which are marginalized (i.e., integrated over) in the likelihood computation. The final result of the computation is as follows:

$$p(o(k)|s) = \int p[o(k)|z(k), s] p[z(k)|s] dz \quad (24)$$
$$= N[o(k); \bar{\mu}_{o_s(k)}, \bar{\Sigma}_{o_s(k)}],$$

where the time-varying mean vector is $$\bar{\mu}_{o_s(k)} = F[z_0(k)] + F'[z_0(k)][a_k \cdot \mu_T - z_0(k)] + \mu_{r_s(k)}, \quad (25)$$

and the time-varying covariance matrix is $$\bar{\Sigma}_{o_s(k)} = \Sigma_{r_s(k)} + F[z_0(k)] \Sigma_{z(k)} (F'[z_0(k)])^{Tr}, \quad (26)$$

or element-by-element:

$$p(o(k)|s(k)) = \prod_{j=1}^{J} \frac{1}{\sqrt{2\pi \sigma_{o_s(k)}(j)}} \exp\left\{-\frac{(o_k(j) - \bar{\mu}_{o_s(k)}(j))^2}{2\sigma_{o_s(k)}(j)}\right\}. \quad (27)$$

This same algorithm can be applied to LPCC (Linear Predictive Coding Coefficients) and warped-LPCC. In the warped-LPCC case, the estimated vector of LPC cepstra ô(k) needs to be warped.

Note that equation (27) calculates the likelihood of an observation frame. To calculate the likelihood score for the whole utterance, each unit segment can be modeled with a three-state HMM.

In the above implementation, the stiffness factor and the number of context frames D are pre-chosen. All other parameters can be trained automatically.

Time-Synchronous Search of HTM

Figure 3:
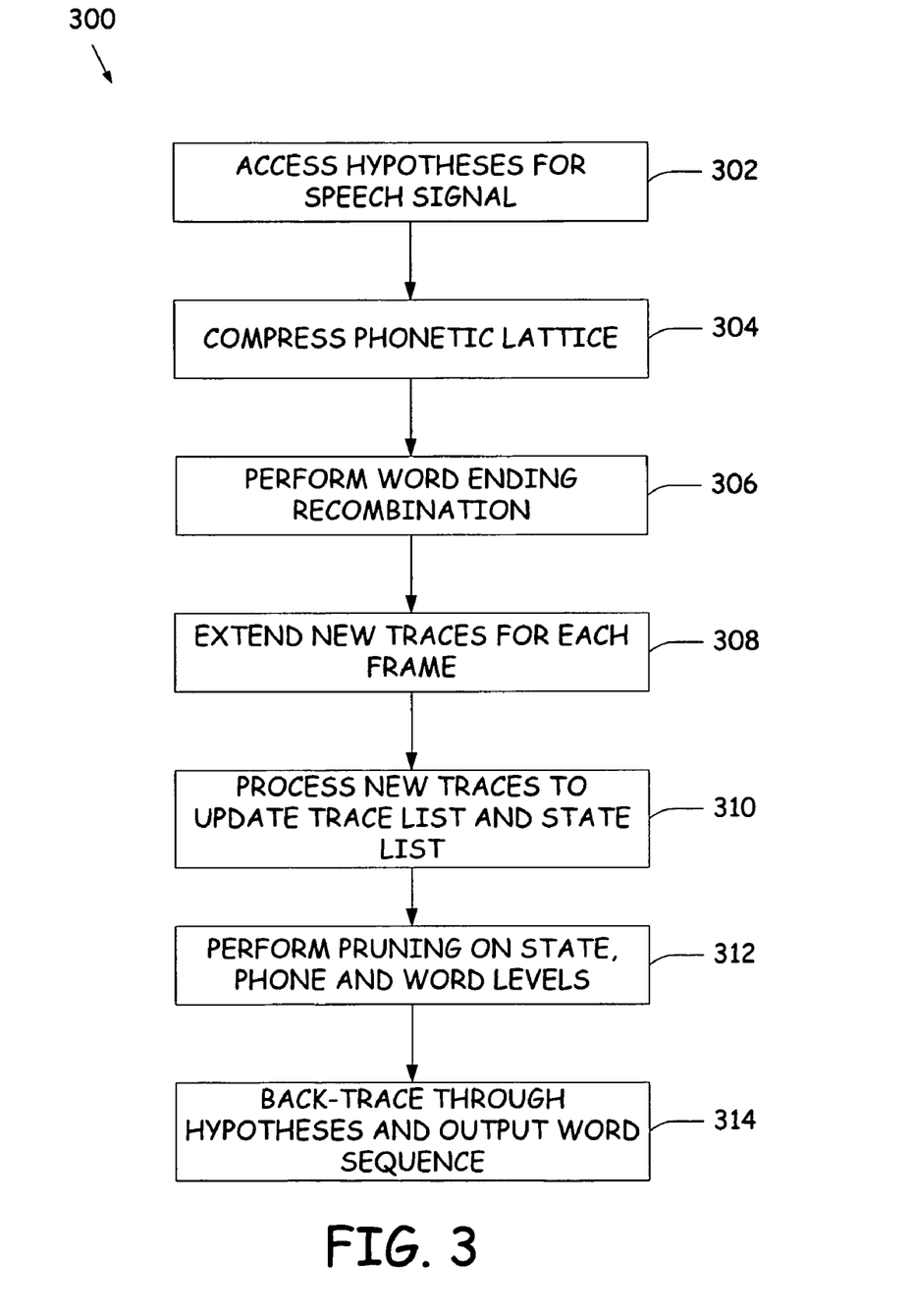
FIG. 3 is a flow diagram of a method for decoding a hidden trajectory model.

FIG. 3 is a flow diagram of a method 300 performed by decoder 212 to search the HTM for the best possible path. At step 302, hypotheses for a speech signal are accessed. In time-synchronous search, there are three levels of search hypotheses including word, unit, and residue state. Hypothesized words can be obtained from lexicon 214 and based on language model 216, in one example. A residue model can be used to describe those speech phenomenon which are not easily characterized by VTR vectors including nasals, silence/short-pause, and noise. Residues are modeled by HMM with regular left-right topology, using equations 15 and 16 above. The word and state hypotheses can be maintained in respective lists.

In HMM-based decoding, the likelihood of each frame (usually 10 ms of speech) is only dependent on the observations of current frame, making the representation of search hypotheses simple. However, in HTM model, the likelihood of each frame is not only dependent on the observation and unit identity of a current frame, but also dependent on unit identities of both previous and future D (D>0) frames. For example, in one HTM model, D=7, which means each hypothesis has to record all unit identities for a 15-frame-long window centered at current frame. Any difference in any unit identity of this window will cause a difference of likelihood score. As a result, each search hypothesis can be based on a data structure called a "trace". Each trace includes a 15-long array to record the unit identity window. Furthermore, each trace can include a pointer pointing to a small array to present HMM-based residue state hypotheses. The traces can be maintained in a trace list for further processing.

Figure 4:
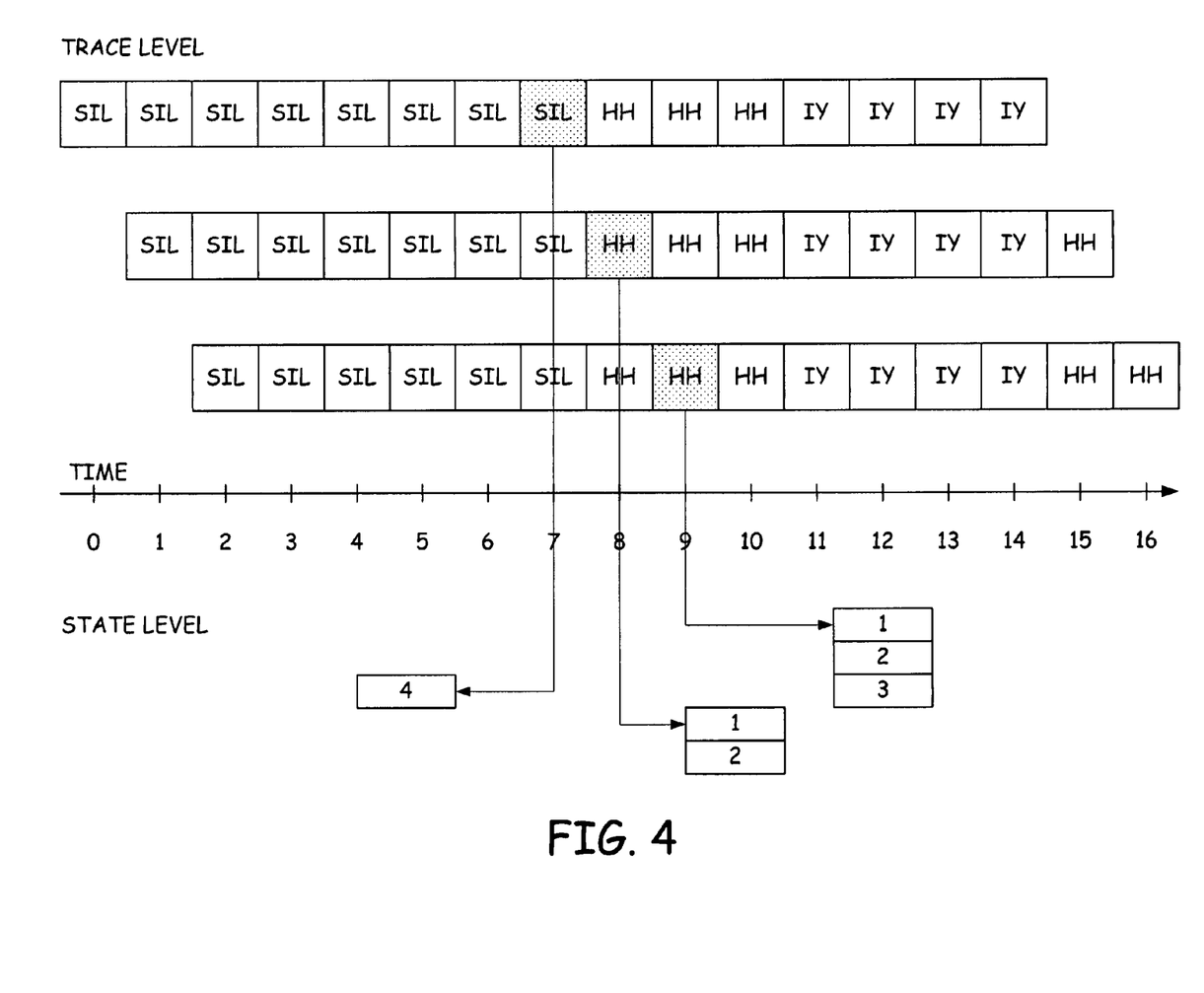
FIG. 4 is a diagram of trace and state-level hypotheses.

FIG. 4 is a diagram of a two-level hypotheses presentation used in the decoder. The diagram shows changes of unit identities when a trace proceeds from time t=7 into t=9. It should be noted each residue HMM has 3 emitting states and 2 non-emitting states, and a size of active state-level hypotheses attached to each trace is dependent on a position of current unit (shaded center block of the window). For example, when t=7, it is known that the current frame is the last frame of silence model, so there is only one active state (state index=4, which is the exit state of residue HMM). When t=8, on the other hand, since current frame is the first frame of hypothesized phone "hh", there should be two active states (state index=1 and 2). Also when t=9, it is the second frame of hypothesized phone "hh", there should be 3 active states attached to current trace.

Figure 5:
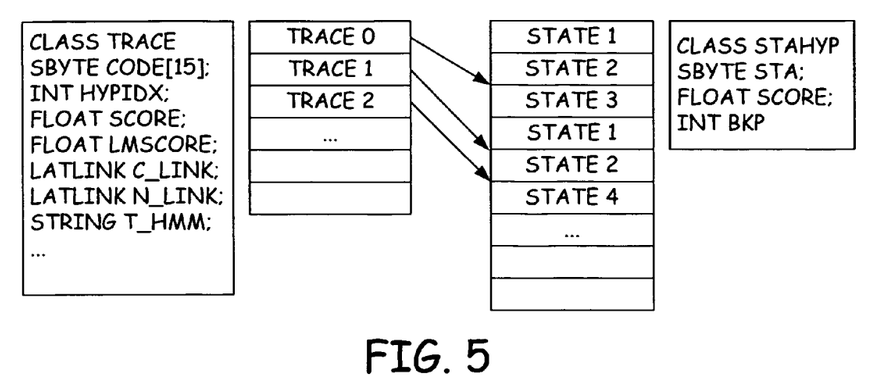
FIG. 5 is a diagram of a phonetic lattice.

Similar to a DP-based (dynamic programming based) algorithm, all different traces, states, as well as words hypotheses activated in each frame can be organized in arrays which enables direct access of any level of search hypotheses. In one embodiment, there are four lists used in the HTM decoder to store the active hypotheses for traces, states, word-endings and words in a back-tracing array. FIG. 5 illustrates an example of a trace list and a state list used in the HTM decoder. There is a pointer in each trace pointing to the ending position of the state list for the current trace. By this means, it is very easy to directly access any hypothesis. FIG. 5 also lists some class members defined in a programming language (which is Visual C#) to represent trace and state-level hypotheses. It is worth noting that there is a one-byte type 15-long array called "code" in class Trace, which is used to store the 15-long phone/unit identities of each trace. Among other member of class Trace, there is one "c_link" member as the current link of lattice, and "n_link" as the next link of lattice for current trace, both of them are objects of class "LatLink". And there is also a string type member "t_hmm" to represent the triphone ID corresponding to current trace.

Besides lists, hash tables can also be used in the decoder. The hash tables can be used for pruning and recombination. Because of the simplicity of using hash table in Visual C# (class "Hashtable"), pruning and recombination of different search hypotheses can be conducted efficiently. One example is in one of subroutines mentioned below relating to merging next time traces. In this subroutine, those active traces activated in immediately previous time will be merged if they have same "next-time" unit identities, i.e., same in all codes except code[0], because they will extend to unique new trace. The algorithm is provided in Table 2.

In the algorithm, the hash table named "Affixes" is used to do merging. A key for this hash table is constructed by connecting all those unit indices except the first code (code[1]~code[14]) and the unit id of next lattice link (accounting for triphone's right context) by separator signs. For those traces with same hash keys, only the one with the highest score will be kept and all others will be discarded.

TABLE 2

Algorithm for merge next-time trace

For all active traces in Trace List (i from 0 to M-1)
    Get trace tr = TraceList[i]
    key=tr.code[1] +"|"+tr.code[2]+"|"+...+tr.code[14]+"|"
+tr.n_link.Word
        If hashtable Affixes already has this key
        Get stored trace std_tr = Affixes[key] as Trace
            If Std_tr.score < tr.score
                Affixes[key] = tr
                Prune out std_tr
            Else
                Affixes[key] = tr
            End If
        Else
            Affixes[key] = tr
        End If
End For Another difference of time-synchronous decoding for HTM and HMM is the size of search space. For HMM, the search space grows almost linearly with the frame number, mainly because of the assumption that each frame's likelihood is independent of each other, therefore word-ending recombination can be effectively employed to reduce the search space. However, in HTM, this assumption does not hold any more, which makes the number of active traces grow exponentially.

Figure 6:
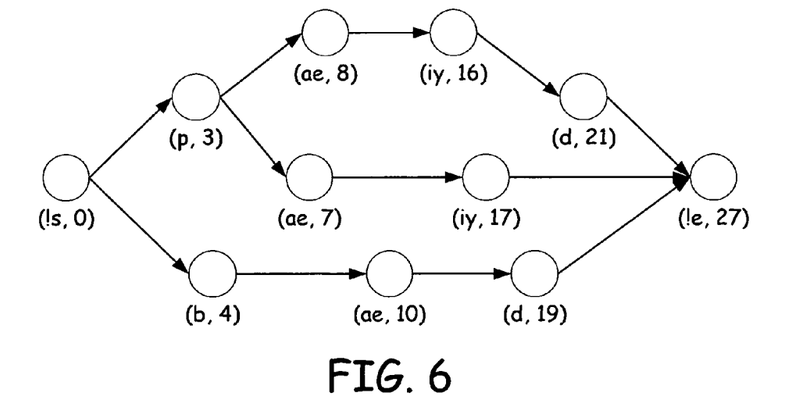
FIG. 6 is a diagram of a compressed lattice based on the lattice in FIG. 5.
Figure 7:
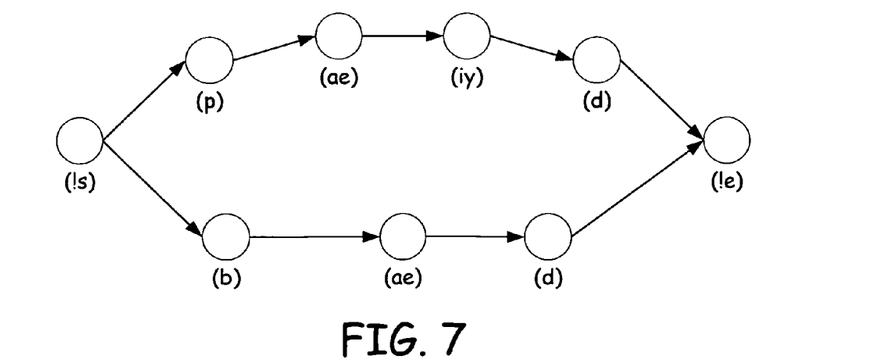
FIG. 7 is a graph illustrating word recombination.

In order to reduce the search space, a lattice is compressed at step 304. A lattice generated using a regular triphone HMM model is used to constrain time-synchronous search of HTM. One exemplary lattice is illustrated in FIG. 6. The lattice includes nodes and arcs between nodes to indicate transitions among units. Each node includes an indication of a unit and a frame time in which the unit begins. To compress the lattice, time information at each node is dropped and those nodes which only differ in timing information are merged. FIG. 7 illustrates a compressed lattice from the lattice in FIG. 6. The lattice in FIG. 7 does not include time information. Furthermore, two nodes indicating phone "ae" in FIG. 6 have been merged into a single node in FIG. 7 and two nodes indicating phone "iy" in FIG. 8 have been merged into a single node in FIG. 7.

This compressing procedure is similar to minimization processing of a Weighted Finite State Transducer (WFST). In one example, the compressed lattices can be only ⅓ to ½ of the size compared with original lattices. Even with the compressed lattice, an oracle word error rate (WER) for this lattice is very low and almost all correct hypotheses are already included in the lattice. Additionally, with this compressed lattice, extension of new traces can be constrained by the lattice and thus the size of search space can be reduced.

Figure 8:
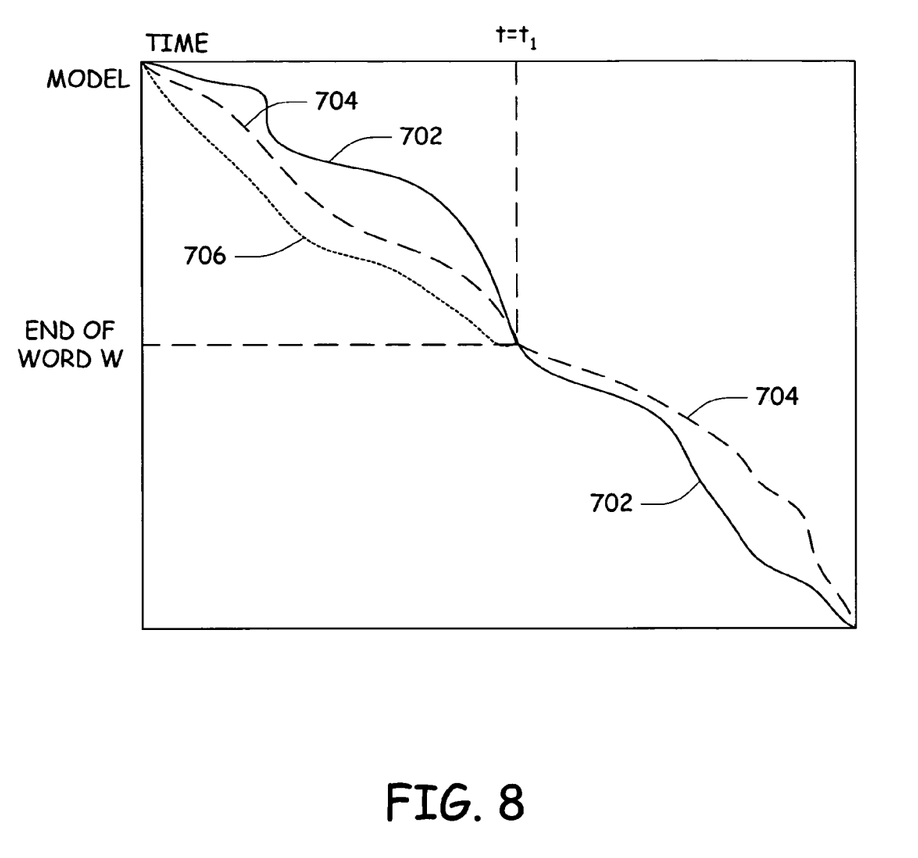
FIG. 8 is a flow diagram of a method for processing traces.

At step 306 of FIG. 3, approximate word-ending recombination is performed to reduce search space. FIG. 8 is a graph of possible paths 702, 704 and 706. The paths 702, 704 and 706 reach the same word ending of word w at time $t=t_1$, and $P_{706}<P_{704}<P_{702}$, where $P_i$ is the path score for path i. If decoding is based on HMM with within-word acoustic model and bigram language model, then word recombination means that only path 702 needs to be kept, and the other two paths can be discarded without any loss of accuracy. However, in HTM based decoding, this word recombination can cause search errors because path 704 and path 706 may have higher score than path 702 in the near future resulted from the 15-frame-long decoding window. However, approximate word recombination can be conducted by setting a threshold as $T_w$. The highest path score is obtained as $P_{best}$ among all those paths reaching w at time $t_1$. Those paths that have scores $P_i<P_{best}-T_w$ can be pruned. In FIG. 8, it is assumed $P_{706}<P_{704}-T_w$ and $P_{704}>P_{702}-T_w$. Thus, path 706 is pruned out and other two paths 702 and 704 are kept.

At step 308, new traces are extended in each frame of decoding. For each old trace in trace list, the extension of new traces depends on last unit identity in the 15-long-window of the old trace. In one example, units usually have a duration of at least three frames. Thus, if the last unit has already continuously spanned for 3 frames, new units which can be followed by this unit will be extended. Otherwise, a new trace will just repeat the unit identity in the last position of its unit-id window. For example, if the unit id array of a trace is: sil-sil-sil-sil-sil-b-b-*b*-uw-uw-uw-uw-uw-uw-sh, where '*' designates the unit ID at current frame t, then the only possible new trace extended from this trace at t+1 will be: sil-sil-sil-sil-b-b-b-*uw*-uw-uw-uw-uw-sh-sh.

Figure 9:
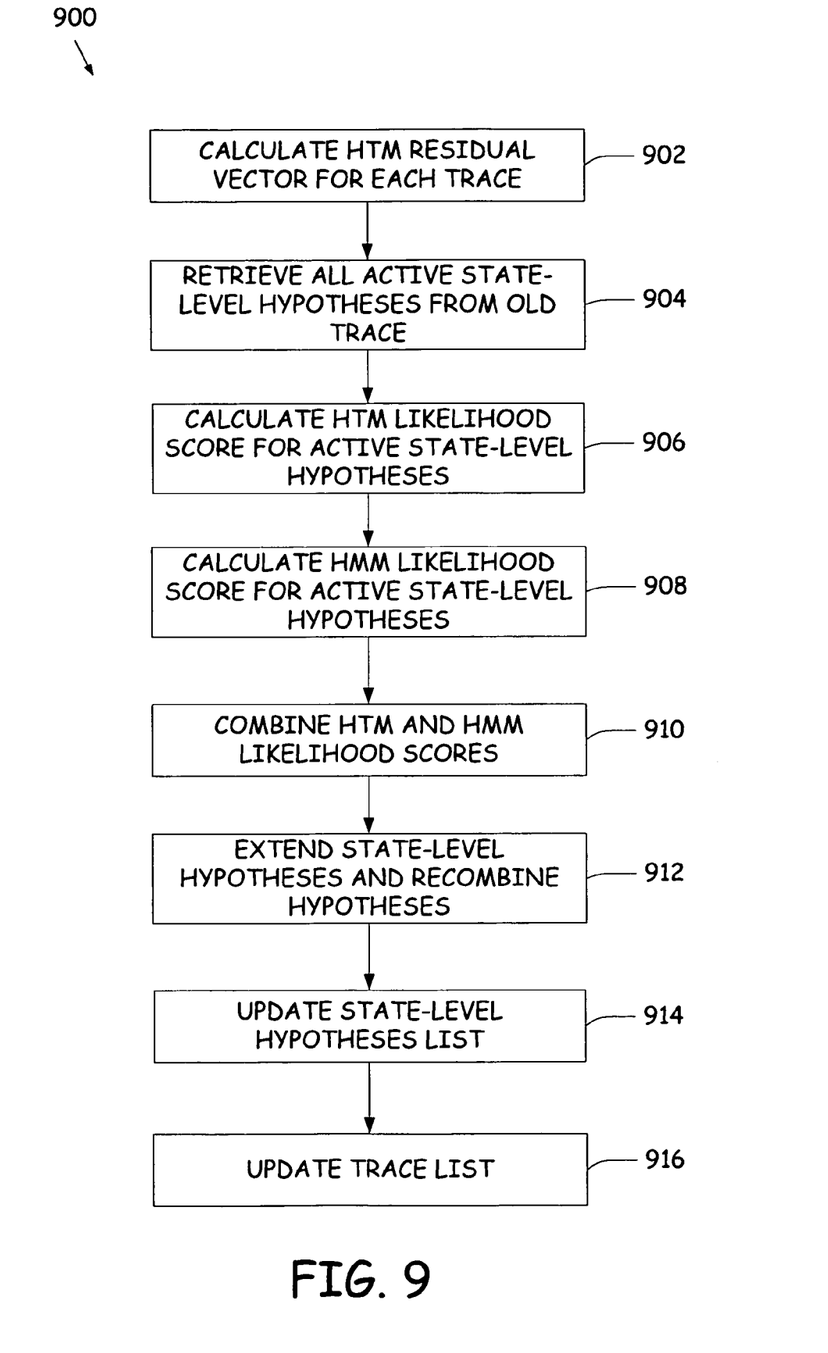
FIG. 9 is a flow diagram of a method for processing traces.

Once the new traces for each frame have been extended, the new traces can be processed at step 310 to update the trace list and state list. FIG. 9 is a flow diagram of a method 900 for processing the new traces. At step 902, an HTM residual vector is calculated for all of the new traces. Next, all active state level hypotheses are retrieved from the old trace at step 904. The HTM likelihood score and HMM likelihood score are calculated for active state level hypotheses at step 906 and 908, respectively. The HTM and HMM likelihood scores are combined at step 910. The state-level hypotheses are then extended and recombined at step 912 for example by using dynamic programming. The recombination can prune state-level hypotheses based on the combined HTM and HMM likelihood scores. At step 914, the state-level hypotheses lists are updated based on the recombination in step 912. Additionally, the trace list is updated at step 916.

Referring back to FIG. 3, further pruning on state, unit and word levels can be performed at step 312. Different pruning methods can make the search space compact and at the same time keep the best path in the pruned hypotheses. In one embodiment, two pruning methods can be used in HTM decoder including beam pruning and histogram pruning for all state, phone/unit and word levels. In beam pruning, only paths with likelihood scores close to the best partial path hypothesis are retained. In histogram pruning, a number of active partial hypotheses can be limited by a predefined number.

For histogram pruning, it is observed that when those traces at a same time have different likelihoods if they are different in any one unit identity among their 15-frame-long unit identities. However, in most cases, the likelihood values are actually very close for those traces. So if a histogram threshold N is arbitrarily set as the permitted number of highest scored paths, N must be a very large number to hold all those hypotheses which may include the correct result (for example, N can be hundreds of thousands). This threshold can make pruning operations inefficient and take too much memory. An alternative method is to look at those unit IDs only near to the center of the 15-frame-long unit identity array (i.e., near to the current unit). Units in the two ends of the trace will have the least effect to the trace's current likelihood. Each HTM trace can be attached with a triphone ID to represent the nearest left- and right-context of the current unit, and only count those traces with different triphone IDs as different traces for pruning. Thus, the histogram pruning threshold N is set as the permitted number of those kinds of different traces. It is found that it is enough to keep N at most as thousands level.

After pruning the hypotheses, method 300 can back-trace through the hypotheses and output a word sequence based on a likelihood score at step 314. Thus, an efficient time-synchronous search algorithm is realized to improve HTM decoding.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of processing speech with a computer having a processor, comprising:

accessing a speech signal with the processor;

dividing the speech signal into temporal frames with the processor;

using a Hidden Markov Model to generate a residue array for each frame;

using a hidden trajectory model to generate, with the processor, a plurality of possible traces based on vocal tract resonances corresponding to each of the frames, each trace including a sequence of linguistic units comprising a linguistic unit corresponding to a current frame, a plurality of linguistic units corresponding to a plurality of possible previous frames in the speech signal and a plurality of linguistic units corresponding to a plurality of possible future frames in the speech signal, each trace also including a pointer to a corresponding residue array that represents state hypotheses generated using a Hidden Markov Model for the current frame; and calculating a likelihood score for each possible trace using both the residue array generated by the Hidden Markov Model and the hidden trajectory model by using vocal tract resonance values corresponding to each trace as hidden variables;

when a given plurality of possible traces each include a same word ending the trace in a same frame, then discarding possible traces, in the given plurality of possible traces, from further consideration if the possible traces to be discarded have a score, that is less than a score for a highest scoring trace in the given plurality of possible traces by a predetermined threshold value;

comparing scores for each of a plurality of remaining possible traces to one another to determine a best possible trace from the plurality of remaining possible traces; and outputting the plurality of linguistic units corresponding to the best possible trace.

2. The method of claim 1 wherein calculating a score comprises generating scores for each possible trace based on the linguistic units corresponding to each possible trace.

3. A speech recognizer, comprising:
    a frame constructor dividing a speech signal into a plurality of temporal frames;
    a hidden trajectory acoustic model generating a plurality of possible traces for the speech signal based on vocal tract resonances in the speech signal;
    a hidden Markov acoustic model generating residue array for each frame, each trace including a sequence of linguistic units comprising a linguistic unit corresponding to a current frame, a plurality of linguistic units corresponding to a plurality of possible previous frames in the speech signal, a plurality of linguistic units corresponding to a plurality of possible future frames in the speech signal, and a pointer to a corresponding residue array that represents state hypotheses generated using the hidden Markov acoustic model for the current frame, the hidden trajectory model generating the plurality of possible traces by calculating a likelihood score for each possible trace using the residue array generated by the hidden Markov acoustic model and the hidden trajectory acoustic model by using vocal tract resonance values corresponding to each trace as hidden variables;
    a decoder operably coupled to at least one of the hidden trajectory acoustic model and the hidden Markov acoustic model, the decoder generating scores for each trace in the plurality of possible traces, wherein when a given plurality of possible traces each include a same word ending the trace in a same frame possible traces in the given plurality of possible traces are discarded from further consideration if the possible traces to be discarded have a score that is less than a score for a highest scoring trace in the given plurality of possible traces by a predetermined threshold value, and wherein the decoder compares scores for each of a plurality of remaining possible traces to one another to identify a best scoring trace in the plurality of remaining possible traces; and
    a computer processor, being a functional component of the speech recognizer and responsive to the decoder to facilitate generating scores and comparing the scores.

4. The recognizer of claim 3 wherein the hidden trajectory acoustic model merges traces from the plurality of possible traces as a function of the plurality of linguistic units.

5. The recognizer of claim 3 and further comprising a language model generating a plurality of possible sequences of words for the speech signal, each of the plurality of possible traces corresponding to a possible sequence of words, each possible sequence of words having an ending point, and wherein the decoder eliminates traces from the plurality of possible traces if the traces having a same ending point and the scores generated for the traces are within more than a threshold value of one another.

6. A method, implemented by a computer with a processor, comprising:
    accessing a plurality of hypothesized traces, using the processor, the traces corresponding to a speech signal, each trace including a plurality of linguistic units representing a plurality of temporal frames in the speech signal, the temporal frames in each trace including a current frame and a plurality of previous frames occurring prior to the current frame in the speech signal and a plurality of subsequent frames occurring subsequent to the current frame in the speech signal, the plurality of linguistic units being derived from the speech signal using vocal tract resonances modeled by a hidden trajectory model, the hidden trajectory model generating the traces by calculating a score for each speech unit using a corresponding vocal tract resonance value as a hidden variable, each trace further comprising a reference to state hypotheses generated for the current frame using a Hidden Markov Model;
    using the processor to calculate a likelihood score for each of the hypothesized traces based on the plurality of linguistic units derived from the speech signal using vocal tract resonances modeled by the hidden trajectory model as hidden variables and a residue array that represents state hypotheses generated using the Hidden Markov Model; and
    removing some of the plurality of hypothesized traces from the plurality of hypothesized traces if the hypothesized traces to be removed have a likelihood score that is at least a threshold amount below a highest scoring one of the hypothesized traces.

7. The method of claim 6 wherein the plurality of hypothesized traces corresponds to a plurality of sequences of words.

8. The method of claim 7 and wherein removing comprises:
    removing some of the plurality of hypothesized traces based on the plurality of sequences of words.

9. The method of claim 6 and further comprising:
    identifying a linguistic unit in a last frame of each trace; and
    perfoiining the step of removing based on the linguistic unit in the last frame of each of the hypothesized traces.

10. The method of claim 6, wherein using the processor to calculate a likelihood score comprises:
    calculating the likelihood score for each hypothesized trace using both a residue array generated by the Hidden Markov Model and the hidden trajectory model by using vocal tract resonance values corresponding to each trace as hidden variables.

11. The method of claim 10, wherein calculating the likelihood score comprises generating scores for each hypothesized trace based on the linguistic units corresponding to each hypothesized trace.

12. The method of claim 6, and farther comprising:
    comparing likelihood scores for each of a plurality of remaining hypothesized traces to one another to determine a best possible trace from the plurality of remaining hypothesized traces.

* * * * *